Feb. 14, 1961  C. L. DAVIS  2,971,740
BULK WEIGHING AND TRANSFER MACHINE
Filed March 11, 1957  5 Sheets-Sheet 1

FIG. 1

INVENTOR.
CAREY L. DAVIS
BY
*Patrick D. Henry*
ATTORNEY

C. L. DAVIS 2,971,740

BULK WEIGHING AND TRANSFER MACHINE

Filed March 11, 1957

INVENTOR.
CAREY L. DAVIS
BY
*Patrick D. Henry*
ATTORNEY

United States Patent Office 2,971,740
Patented Feb. 14, 1961

2,971,740

BULK WEIGHING AND TRANSFER MACHINE

Carey L. Davis, Decatur, Ga.
(1691 Dresden Drive NE., Atlanta 19, Ga.)

Filed Mar. 11, 1957, Ser. No. 645,377

13 Claims. (Cl. 249—19)

This invention relates to a bulk weighing and transfer machine and especially to a machine of that sort which receives bulk material continuously from a source and continuously or intermittently separates said bulk material into smaller weighed or measured portions and transfers same for individual containers.

Generally described, without limitation on the scope of coverage found in the claims, the machine consists of a support frame either from the floor or ceiling, a generally cylindrical hopper divided into two or more sections and rotatable about a horizontal axis, swung by weights from the frame to be vertically movable for a limited amount with the weights mounted on a weighing frame swung from the main frame and comprise both primary weights and secondary or dribble weights, a hopper gate is mounted on said frame to selectively move from feeding to closing position, a control section for said gate is mounted for movement on said frame and has a two position cam device engageable with arms mounted rigidly with said hopper shaft so that said sector is moved by contact and switches the gate from filling to slow filling to closed, with said arms, other arms on said hopper shaft are positioned to contact a stop bar to limit movement of said hopper about its shaft while said hopper is filling, said sector has a special type of positive control mechanism, and various manual control elements are provided on the machine.

In operation, the machine starts with the hopper empty and once put into operation will continue to weigh and empty automatically if desired or it can be done manually each time. With the gate open, bulk material is fed into the machine hopper section from above by gravity and as the hopper fills it moves downwardly vertically against the counterweights and then becomes overbalanced rotatably until it rotates on its axis. Initially the first stage of the sector holds the gate open for fast filling as the hopper fills and moves downwardly; then upon reaching the pre-set weight, the fast fill is closed by the sector and engages the second stage for slow or dribble filling which is terminated fast as the hopper reaches proper weight. The gate is closed only momentarily during automatic operation and then is opened quickly by the arm on the hopper shaft to fill the next hopper section and so on. The novel dribble mechanism is accurate and simple in construction. Also, the weighing arrangement is unusual and very dependable.

In summation: a sectionalized hopper swung from pre-set counter-balanced weights is both vertically and rotatably movable and fills by gravity from a bulk source and dumps on each successive rotational movement with the proper weight of material in the hopper. A novel gate arrangement opens and closes the gate for both fast and slow (accurate) feed. A particular form of weight frame and arrangement provides the accurate setting and changing; and a shock or buffer construction permits fast, rugged operation.

A primary object of this invention is to provide a gravity feed device which will weigh or measure from continuously fed bulk material into smaller pre-determined quantities.

Another aim of this invention is to provide such a device with a positive feed device controlled for both fast and slow feed. Such an arrangement is sometimes referred to as a "dribble" device.

An object of this invention is to present a "dribble" gate control arrangement which is fast and positive and has considerable durability.

An additional object is found in manner of arranging the counterweights and dribble weights for better operation of both weighing and dribble feed.

The mounting arrangement for the control hub of this invention is a desirable feature thereof and is intended as an advantage in this art.

For purposes of detailed description the following text will proceed into a complete discussion of one particular design of my invention. As this is read and understood, various other objects and advantages too numerous to outline above in detail will appear and additional uses and values will appear from this specification taken in conjunction with several sheets of accompanying drawings, wherein:

Referring to the drawings the machine 10 is preferably swung from a pair of elongated opposed, spaced beams 11, 12 having a shorter pair of transverse, opposed, spaced beams 14, 16 near the center thereof to which is fastened the upper bulk feed hopper 18 and the machine frame in general 20. The machine 10 is enclosed by an outer plate casing 22 and an inner plate casing 24 of strong steel plate or similar material serving both to protect the inner parts of the machine and to provide surfaces on which various other parts and elements are mounted.

Beams 11, 12, 14 and 16 support through a system of balanced weights to be described more in detail later on a generally cylindrical, rotatable hopper transfer device 26 having a plurality of compartments 28 therein formed by arcuate baffles 30. Hopper 26 is mounted for rotation with a central shaft 32 journaled in bearing 34 in front of plate 36 of outer casing 22 and also in a bearing 38 supported on a bearing box member 40 fixed on plate 36; and at the rear in bearing 41, rear of plate 42 casing 22 and on a rear bearing 43 in bearing box member 44 fixed on rear plate 42. Fixed in front of plate 36 with bearing 32 is a support plate 46 and likewise fixed to the rear of plate 42 is a similar support plate 48. Each plate 46, 48 has a respective similar pair of converging support arms 50, 52 fixed thereto and diverging upwardly to be joined at the top thereof by a respective cross-member 54, 56 and side members 58, 60 to form a framework supporting the hopper 26 rotatably on the shaft 32.

Fixed on shaft 32 by means of a special shock mounting to be described in detail on a hub 61 located between front casing plate 36 and inner casing 24 is a hub plate 62 having a plurality of "spider-like" arms mounted thereon, there being front or outer arms 64 and back or inner arms 66. There is one front arm 64 and one back arm 66 for each of the compartments 28 in the hopper 26 making three of each in this embodiment; and front arms 64 are out of phase in arcuate angular displacement with back arms 66. Mounted from the inner rear plate frame 68 of casing 24 is a stop and shock absorber device 70 consisting of a bell crank arm 72 journalled on a shaft 74 on plate 76 and with a rubber or similar knob-like bumper 77 mounted on screw 78 and adjustably contacting the arm 72 to allow limited movement with cushioned effect. The outer end of arm 72 has the stop roller 80 thereon in the path of any of the inner or back arms 66 to contact and hold same. With this arrangement, hopper 26 is prevented from rotating by arms 66 contacting roller 80; however, the roller 80 is not in the path of any of the arms 64 since they travel in a plane forwardly thereof.

Mounted on and depending from the bulk hopper 18 is a generally tubular feed spout or pipe 82 protruding inside of the outer casing 22 and into the inner casing 24 to feed directly into the compartments 28 of hopper 26. This feed spout or pipe 82 is removably covered by a gate valve 84 having a generally U-shaped cover 86 (see Fig. 10). Cover 86 has upstanding sides 88, 90 and an arcuate bottom 92 slidably engaging the bottom of pipe 82, and is controlled by means of a rocker arm 94 having shaft 95 in journal 96 on pipe 82 and rotatably mounted in journals 98, 100 on outer casing 22. Fixed on shaft 95 is an arcuate control segment 102 consisting of two arcuate control plates 104, 106 adjustably connected by bolt and nut 108 and slot 110 arrangement and with the outer plate 104 having a fast position cam roller 112 on shaft 113 thereon and a slow position dribble cam roller 114 arcuately spaced therefrom on shaft 115. Roller 114 is movably mounted in one of a series of aligned holes 116 to permit adjustment of the position thereof. At one edge 118 of segment plate 104 is fixedly mounted a bent rod track member 120 having a wheel member 122 confined for rolling movement therein along the inner periphery thereof. The bottom edge 124 of segment plate 104 has a depending re-set tab or ear 126 thereon with a cam roller 128 protruding therefrom on shaft 129. Cam roller 128 is positioned forwardly of hub 62 in the path of the arms 64 to be contacted thereby to move the plates 104, 106 which moves the gate valve 84 thereby controlling the movement thereof and is intended as a re-setting device after the gate has been open and then closed. An open cage 129 formed from rods 131 guides the weight in movement.

Figure 8:
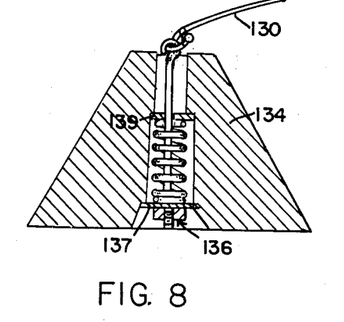
Fig. 8 is a cross-sectional view taken substantially along the line 8—8 in Fig. 2.
Figure 9:
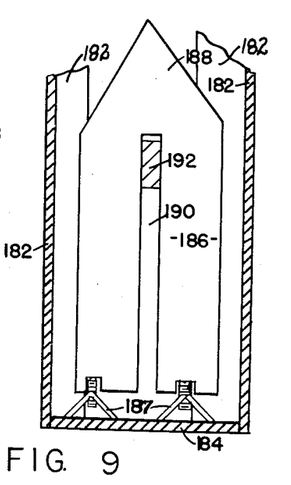
Fig. 9 is an enlarged cross-sectional view of the "dribble" weight taken substantially along line 9—9 in Fig. 1.

Wheel 122 rolls along the inner periphery of track 120 and has connected thereto a flexible cable 130 passing over a pulley 132 on frame 122 and then hanging downwardly therefrom with a counterweight 134 mounted thereon. As is seen in the detail Fig. 8, counterweight 134 is bored in the center 135 to receive a bolt and nut assembly 136 with washer 137 mounted with an encompassing coil spring 138 against washers 139 acting as a shock absorber for wheel 122 through cable 130.

Figure 5:
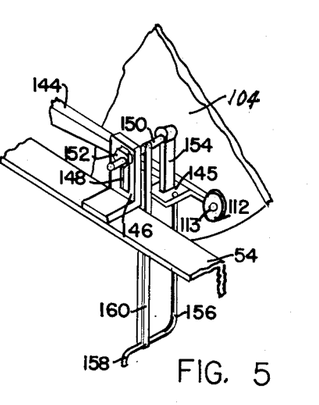
Fig. 5 is a perspective view of the gate control device taken substantially along the line 5—5 in Fig. 1.

Mounted on a plate 140 on frame 20 and casing 22 in a journal 142 is a movable stop and set arm member 144 which protrudes laterally of the machine across the front and generally in the path of both cam rollers 112 and 114 and is intended to engage one or the other of these at certain positions of the gate valve 84. Arm 144 has a forwardly extending, flat plate 145 thereon. As is readily seen in both Fig. 2 and the detail Fig. 5, an adjustment slotted plate 146 with slot 148 is welded or otherwise fixed on top of front cross member 54 in front of arm 144 and has adjustably fixed therein a stud member 140 with nut 152 and stud 150 is held by a lug member 154 depending therefrom. Stop 154 has the bottom thereof resting on and engaging the plate 145. A small retainer rod 156 depends from plate 145 and has bent bottom end 158 receiving a continuous rubber band member 160 looped around shaft of stud 150. Therefore, with stud 150 locked in desired but adjustable position on plate 146 the stop member 154 bears resiliently against the plate 145 holding arm 144 in a resilient position against cam roller 112.

Figures 3, 10:
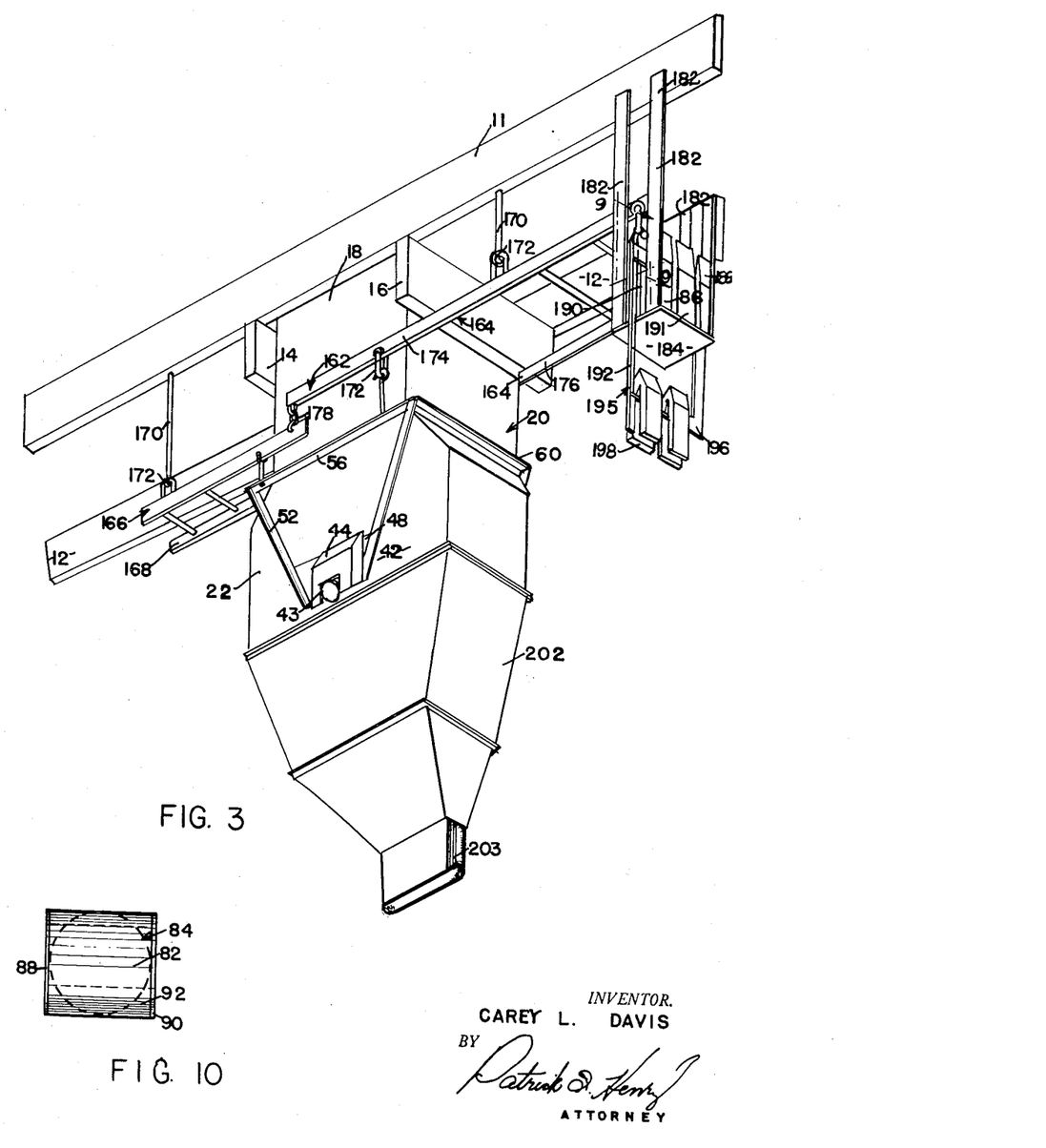
Fig. 3 is a perspective view of the back of the machine hung from ceiling joists and showing the weight frame arrangement.
Fig. 10 is a bottom view of a detail.

Referring to the Fig. 3 view, the weight frame arrangement consists of a ladder-like frame generally at 162 comprising two parts: the weight frame part 164 and the other side 166. Frame part 164 has two sides, spaced parallel members 167, 168 supported with limited movement from respective beams 11, 12 by means of respective hanging brackets 170 with hooked ends hooked into U-shaped hangers 172 welded to the members 167, 168. Identical hangers 172 are fixed respectively on the bottom of frame members 167, 168. The other side frame 166 is supported by brackets 170 in respective beams 11, 12 which brackets 170 hook into hangers 172 on a respective side frame 174, 176 forming the frame 166. Member 167 is movably joined to member 174 by means of respective hangers 172 thereon joined by a link 178. In like fashion, the members 168, 176 are movably joined. The entire machine 10 is supported in this movable weight frame by means of hanger brackets 170, two spaced and fixed on each of the members 54, 56 and hung in the hangers 172 on the bottoms of members 167, 168 and 174, 176.

A weight frame platform assembly 180 is rigidly supported from beams 11, 12 by means of spaced, parallel support members 182 with a bottom support platform plate 184 thereon. One "dribble" weight 186 rests normally on the plate 184 on inverted angle irons 187 providing a sharp contact. Weight 186 is of a generally "box-like" construction but with a peaked top 188 and with a central slot 190 therein which received the bars to support the weights. Other weights 191 are mounted with 186 in a column on platform 184 with respective slots 190 forming one continuous groove into which it normally fitted a lifting bar 192 hung by hooks 194 from hangers 172 on the bottom of respective frames 167, 168 and bar 192 is the top member of a rigid "picture-frame" type assembly 194 having a bottom member 196 on which are mounted counterweights 198 identical in construction with weights 186, 187 and which support the hopper 26. Weights 198 are selected according to the weight of material to be weighed. The slot 190 in dribble weight 186 is higher than in weights 191 thereby being contacted by bar 192 later. Weights 191 are an amount sufficient just to balance the swung mass of the hopper 26 and related parts with the frame 164 tilted. Weights 198 are preselected according to the near full amount of each unit to be weighed in the hopper compartments leaving just a small amount short represented by the dribble weight 186.

The bottom 200 of casings 20, 22 taper into a lower outlet hopper 202 having an outlet spout 203 thereon onto which bags or other receptacles may be mounted or positioned. A hand control assembly 204 is mounted to be actuated near the outlet spout 202 and consists of a pivot plate 206 mounted by pin 208 on a metal bracket 210 on spout 202 and an actuating rod 212 connected with a bell crank lever 214 having a cam roller 216 thereon positionable in the path of the members 66 but normally retracted away therefrom. This assembly 204 can be used to stop the machine both for loading and for intermittent feeding if desired but normally with the machine in automatic position it would be pivoted out of the way. A back stop lock 218 is mounted on the outer hopper 26 wall and consists of a rigid plate 220 with a spring pressed detent or latch plate 22 therein which is slanted to the direction of travel of the inner arms 66 to prevent backward movement thereof but not normal forward movement.

*Machine operation*

Figure 1:
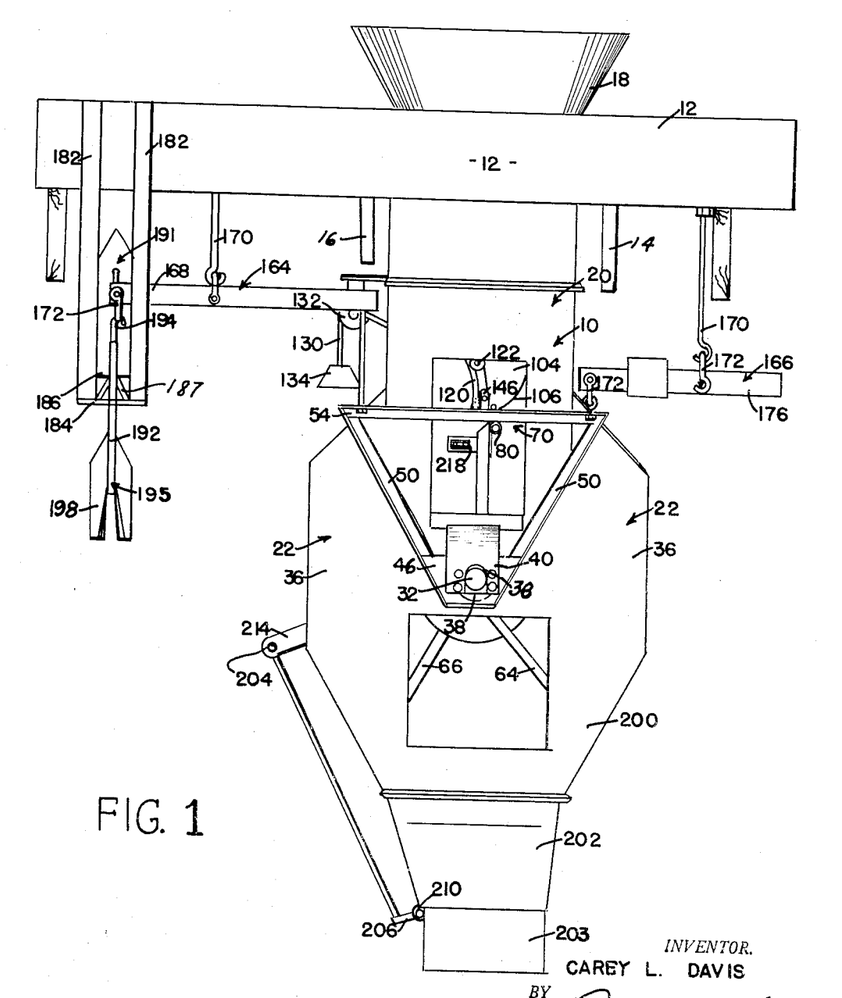
Fig. 1 is a front elevation view of my complete machine with various parts enclosed in protective casings.
Figure 2:
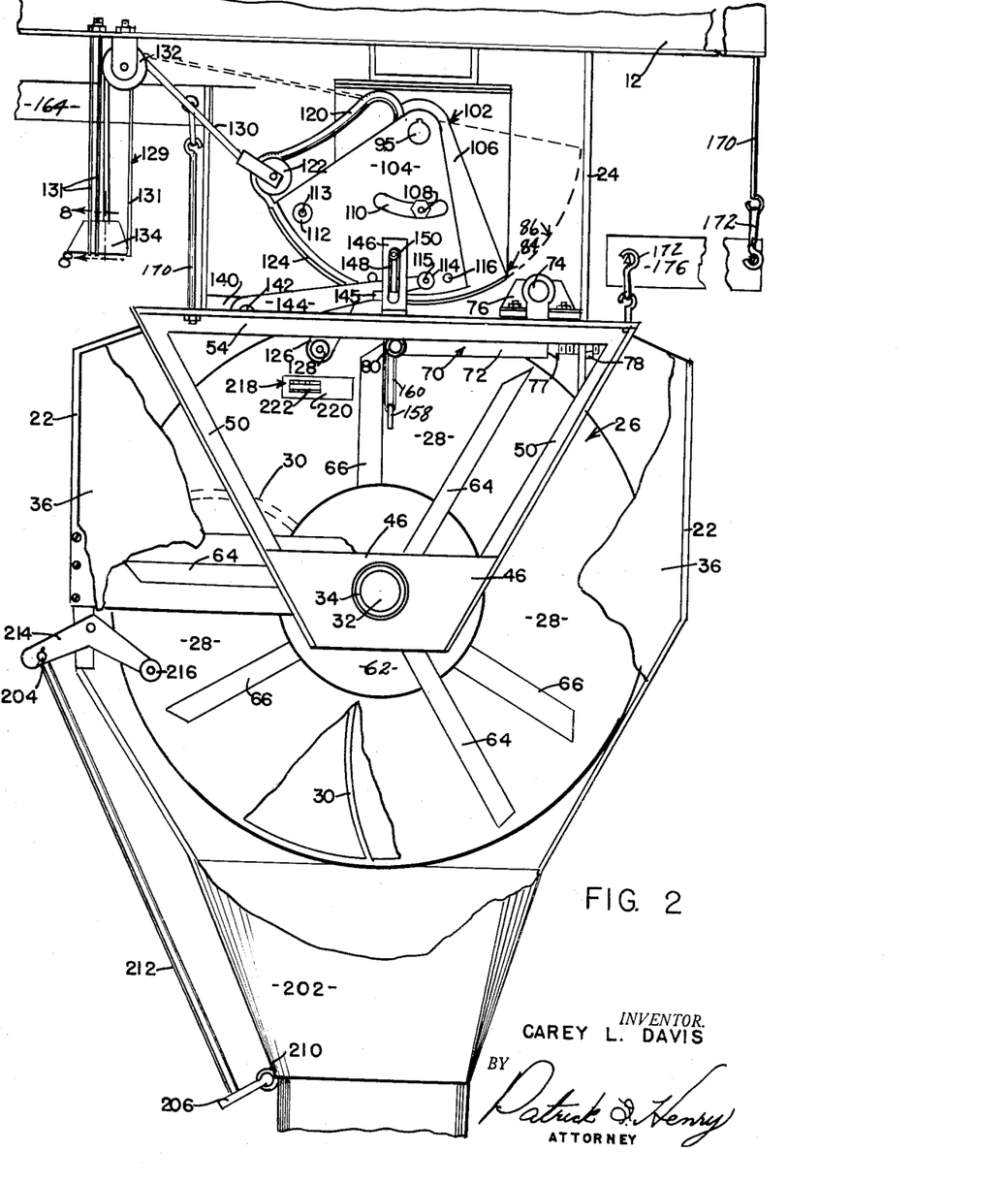
Fig. 2 is a front elevation view similar to that of Fig. 1 but in larger scale to show details and with parts of the cover casing broken away.
Figure 4:
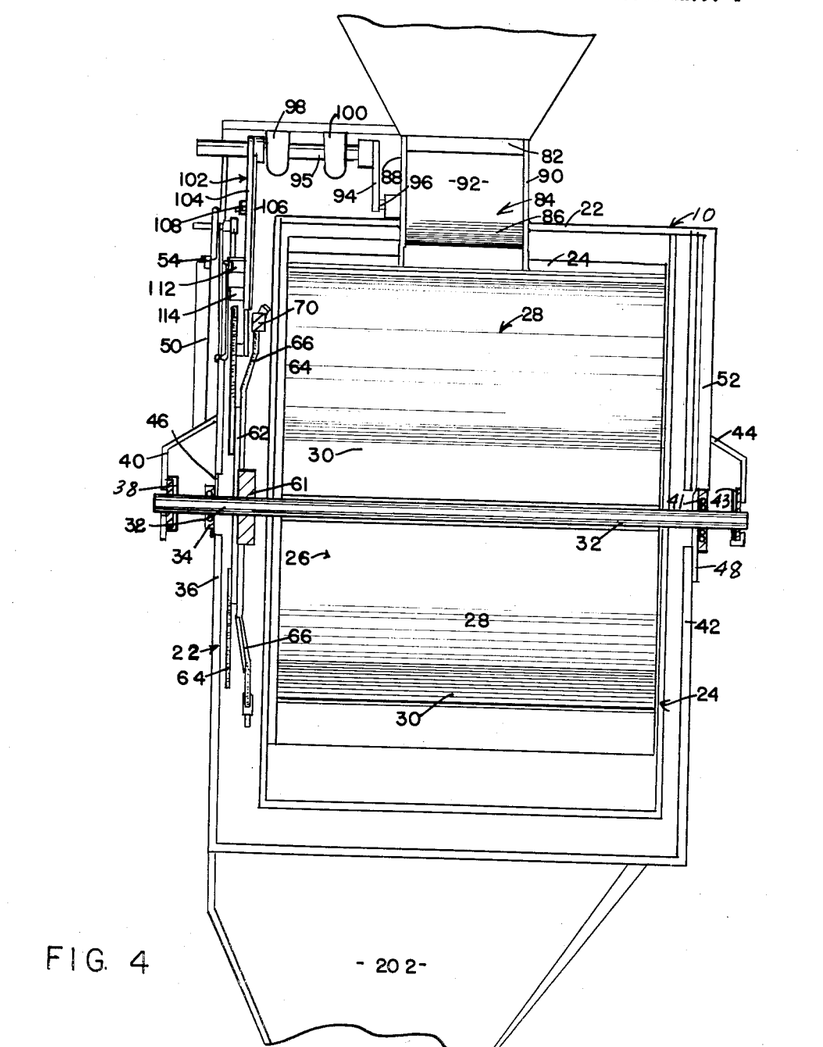
Fig. 4 is a transverse, vertical section view of the machine substantially along the line 4—4 in Fig. 2.

With the rotatable hopper 26 empty and the upper bulk hopper 18 full of bulk material to be fed through spout 82, the counterweights 198 are selected in weight to determine the weight of the bulk material to be fed on each stroke (for example: 105# for a bag fill) and the empty hopper 26 is supported in uppermost position of Fig. 2 with the gate valve 84 closed in the dotted line position of Fig. 10. In this initial position, the gate valve 84 is pressure loaded toward closing due to the weight 134 and is held closed by the arm 144 engaging the cam roller 112. In this position, arm 66 engages the stop device 70 preventing the hopper 26 from moving. Bulk material pours into the uppermost hopper compartment 28 from spout 82 and as the weight of the hopper increases, the hopper 26 without moving about shaft 32 moves downwardly against the weights 191 until it exceeds their amount at which time the hopper 26 descends pushing lug 154 against plate 145 thereby bringing arm 144 out of contact with cam 112 which permits weight 134 to act in track 120 to move segment 104 thereby closing the fast feed of the gate valve 84 by moving the cover 86. It is readily seen from Figs. 4 and 10 how the gate valve cover 86 closes the pipe 82 from fast to dribble. Hopper 26 still has arm 66 in contact with and travelling past roller cam 80 and is prevented from rotating thereby. Plate 104 moves to bring cam 114 into engagement with arm 144 in the position shown in full lines of Fig. 10. In this position, which does not last long, the gate valve 84 is dribbling the small final amount necessary to bring the hopper compartment to the final weight now determined by the bar 192 lifting the dribble weight 186.

When bar 192 is lifted enough to lift dribble weight 186, the hopper 26 descends enough to bring arm 144 out of contact with cam 114 by the lug 154 pressing on the plate 145 as stud 150 and plate 146 move downwardly with member 54 and to bring arm 66 past roller 80 which causes the hopper to rotate to dump the material in the top compartment 28 just filled into the bottom 202 and out of the spout 203. Following immediately behind arm 66 is arm 64 which contacts roller 128 on member 126 pushing the plate 104 back to open gate valve 84 in re-set position starting another filling of the new upper compartment 28. The next arm 66 contacts the shock bumper roller 80 on arm 72 and stops the movement of hopper 26. The shock of arm 66 hitting the roller 80 is reduced by the rubber bumper 77 absorbing the motion of arm 72. Backward motion of arm 66 from any rebound in hitting the bumper arm 72 is limited by the back stop lock 218. With this arrangement, the cycle of filling and dumping and the accurate intermediate step of dribble is repeated continuously and automatically by the machine itself by gravity from the flowing material.

Figure 6:
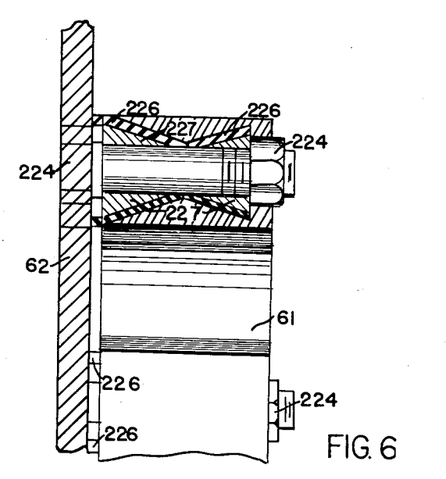
Fig. 6 is a vertical cross-sectional view taken substantially along the line 6—6 in Fig. 2.
Figure 7:
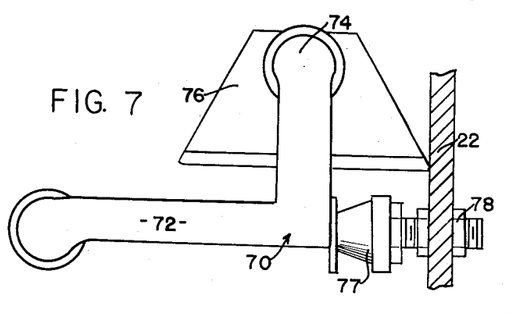
Fig. 7 is a fragmentary view of a detail.

When either of the arm 64, 66 strike the arm 72 there is a shock not absorbed fully by bumper 77 and this is additionally provided for with the hub arrangement shown in detail in Fig. 6 wherein four bolts 224 are welded to the hub plate 62 and support the hub 61 by means of a pair of conical rubber washers or bushings 226 fitted over a respective pair of conical steel washers 227 next to the bolts in conical recesses in the hub. The periphery of the rubber washers or bushings 226 engage and bear against the inner face of plate 62 thereby giving a resilient connection.

Adjustments may be made in various places on the machine to provide always accurate timing and synchronization. For example, stud 150 is adjustable. Buffer 77 is adjustable. Weights 198 are fully variable as is the dribble weight 186 and the machine counterweights 191. Accordingly, slight variations in timing may be readily adjusted.

While I have shown a complete machine in detail with detailed sub-elements, this is not to be construed as any limitation on the scope of my invention since various alterations, changes, eliminations, modifications, and substitutions may be made therein without departing from the scope of the following claims.

I claim:

1. In a machine for measuring and dividing units of material from a bulk feed source such as a storage hopper feeding by gravity and wherein said machine includes a compartmented hopper rotatably mounted on its own axis and also vertically movable beneath the bulk feed source, a stationary frame support for said hopper supporting said hopper for vertical and rotatable movement thereon, a hopper support frame, a weight frame having said hopper support frame attached thereto at one position thereon and being attached to said stationary frame at another position thereon, a weight frame platform attached to said stationary frame, counterweights mounted on said weight frame counterbalancing said hopper to maintain same in substantial upright position, said counterweights being detachable and selective in amounts, other setting weights supported on said weight frame and being detachable and selective to add to the counterbalancing of said hopper thereby setting the amount to be weighed in close approximation, a dribble weight mounted on said weight platform and being relatively light in weight to represent the difference between the setting weights and the exact weight desired on each measurement, a valve on said machine between said bulk feed and said rotatable hopper to feed into the upper hopper compartment, a control segment operatively connected with said valve, movable to open and close the valve, a fast feed stop on said segment, a dribble feed stop on said segment spaced from said fast feed, a track member on said segment, a movable member confined for movement on said track, a flexible member connected with said movable member, a counterweight for said flexible member, said counterweight urging said segment from fast to dribble feed, a stop member on said frame engageable with said stops, an actuating member mounted with said hopper and acting on said stop member when said hopper moves downwardly to bring same out of contact, a hopper stop member on said frame, a plurality of hopper fill stop arm members mounted with said hopper in spaced, arcuate position, a plurality of hopper re-set arms mounted with said hopper in spaced, arcuate relation thereon and a re-set member connected with said segment to move same to re-set.

2. In a machine for measuring and dividing units of material from a bulk feed source such as a storage hopper feeding by gravity and wherein said machine includes a compartmented hopper rotatably mounted on its own axis and also vertically movable beneath the bulk feed source, a stationary frame support for said hopper supporting said hopper for vertical and rotatable movement thereon, a hopper support frame, a weight frame having said hopper support frame attached thereto at one position thereon and being attached to said stationary frame at another position thereon, a weight frame platform attached to said stationary frame, counterweights mounted on said weight frame counterbalancing said hopper to maintain same in substantial upright position, said counterweights being detachable and selective in amounts, other setting weights supported on said weight frame and being detachable and selective to add to the counterbalancing of said hopper thereby setting the amount to be weighed in close approximation, a dribble weight mounted on said weight platform and being relatively light in weight to represent the difference between the setting weights and the exact weight desired on each measurement, a valve on said machine between said bulk feed and said rotatable hopper to feed into the upper hopper compartment, a control means operatively connected with said valve movable to open and close the valve, a fast feed means on said control means, a dribble feed means on said control means independent from said fast feed, means urging said control from fast to dribble feed, an actuating means mounted with said hopper and to actuate acting when said hopper moves downwardly to actuate said control means, a hopper stop member on said frame, means actuatable by said hopper for re-setting said valve, means in engagement operable to hold said hopper in fill position with said gate valve open, said hopper becoming dis-engaged when filling and said control means being operated upon said hopper reaching close fill to operate said valve to close to dribble position, said dribble weight holding said hopper in dribble position until the weight thereof is overcome by the added weight in said hopper at which time said dribble is terminated by said control to release said valve to close and said hopper becomes released to rotate, said hopper rotating to dump the material therefrom and by the motion thereof re-setting said valve in open position at which time another empty compartment of said hopper is in position to be filled, said machine repeating itself in this cycle of operation as long as the bulk material feeds thereinto, whereby bulk material fed by gravity enters the machine through the valve and is fed rapidly at first to fill a hopper compartment and then slowed down suddenly to a dribble to complete the accurate filling of the compartment and whereby said machine measures and separates units of material for transfer into bags or the like.

3. In a machine for measuring and dividing units of material from a bulk feed source such as a storage hopper feeding by gravity and wherein said machine includes a compartmented hopper rotatably mounted on its own axis and also vertically movable beneath the bulk feed source, a stationary frame support for said hopper supporting said hopper for vertical and rotatable movement thereon, a hopper support frame, a weight frame having said hopper support frame attached thereto at one position near one end thereon and being attached to said stationary frame at another position thereon intermediate the length thereof, a weight frame platform attached to said stationary frame adjacent the weight frame end, counterweights mounted on said weight frame counterbalancing, said hopper to maintain same in substantial upright position, said counterweights being detachable and selective in amounts, other setting weights supported on said weight frame and being detachable and selective to add to the counterbalancing of said hopper thereby setting the amount to be weighed in close approximation, a dribble weight mounted on said weight platform and being relatively light in weight to represent the difference between the setting weights and the exact weight desired on each measurement, a dribble contact for a said frame engageable with said dribble weight, a valve on said machine between said bulk feed and said rotatable hopper to feed into the upper hopper compartment, a control means operatively connected with said valve, movable to open and close the valve, a fast feed means on said control means, a dribble feed position on said control, means independent from said fast feed, means urging said control from fast to dribble feed, an actuating means mounted with said hopper and acting when said hopper moves downwardly to actuate said control means, a hopper means for re-setting said valve, means in engagement operable to hold said hopper in fill position with said gate valve open, said hopper becoming dis-engaged when filling and said control being operated upon said hopper reaching close fill to operate said valve to close to dribble position, said dribble weight holding said hopper in dribble position until the weight thereof is overcome by the added weight in said hopper at which time said dribble releases said valve to close and said hopper becomes dis-engaged to release said hopper to rotate, said hopper rotating to dump the material therefrom and by the motion thereof bringing said valve in open position at which time said valve is re-set and another empty compartment of said hopper is in position to be filled, said machine repeating itself in this cycle of operation as long as the bulk material feeds thereinto, whereby bulk material fed by gravity enters the machine through the valve and is fed rapidly at first to fill a hopper compartment and then slowed down suddenly to a dribble to complete the accurate filling of the compartment and whereby said machine measures and separates units of material for transfer into bags or the like.

4. In a machine for measuring and dividing units of material from a bulk feed source such as a storage hopper feeding by gravity and wherein said machine includes a compartmented hopper rotatably mounted on its own axis and also vertically movable against counterweights and beneath the bulk feed source, a valve on said machine between said bulk feed and said rotatable hopper to feed into the upper hopper compartment, a control segment operatively connected with said valve, movable to open and close the valve, a fast feed position on said segment, a dribble feed position on said segment spaced from said fast feed, pressure means urging said segment from fast to dribble feed, a control member on said frame engageable with said segment to position same, an actuating member mounted with said hopper and acting on said control member when said hopper moves downwardly to actuate same, a hopper stop member on said frame, a plurality of hopper fill stop arm members mounted with said hopper in spaced, arcuate position, a plurality of hopper re-set arms mounted with said hopper in spaced, arcuate relation thereon, a re-set member connected with said segment to move same to re-set, said re-set member being operable to move said segment against said counterweight back to open valve position with said stop member in open stop engaging position, said hopper stop member being in engagement with one of said hopper fill stop arms to hold said hopper in fill position with said gate valve open, said hopper becoming dis-engaged from said stop member by moving away therefrom when filling and said segment being operated upon said hopper reaching close fill to operate said valve to close to dribble position, said dribble weight holding said hopper in dribble position until the weight thereof is overcome by the added weight in said hopper at which time said dribble stop becomes disengaged from said segment stop member to release said valve to close and said hopper fill arm becomes dis-engaged from said hopper stop member to release said hopper to rotate, said hopper rotating to dump the material therefrom and by the motion thereof bringing said re-set arm into contact with said re-set member to re-set said valve in open position at which time another empty compartment of said hopper is in position to be filled, said machine repeating itself in this cycle of operation as long as the bulk material feeds thereinto, whereby bulk material fed by gravity enters the machine through the valve and is fed rapidly at first to fill a hopper compartment and then slowed down suddenly to a dribble to complete the accurate filling of the compartment and whereby said machine measures and separates units of material for transfer into bags or the like.

5. In a machine for measuring and dividing units of material from a bulk feed source such as a storage hopper feeding by gravity and wherein said machine includes a compartmented hopper rotatably mounted on its own axis and also vertically movable beneath the bulk feed source, a stationary support for said hopper supporting said hopper for vertical and rotatable movement thereon, a hopper support frame, a weight frame having said hopper support frame attached thereto at one position thereon and being attached to said stationary frame at another position thereon, a weight frame platform attached to said stationary frame, counterweights mounted on said weight frame counterbalancing said hopper to maintain same in substantial upright position, said weights being detachable and selective in amounts, other setting weights supported on said weight frame and being detachable and selective to add to the counterbalancing of said hopper thereby setting the amount to be weighed in close approximation, a dribble weight mounted on said weight platform and being relatively light in weight to represent the difference between setting weights and the exact weight desired on each measurement, a valve on said machine between said bulk feed and said rotatable hopper to feed into the upper hopper compartment, a control segment movable to open and close said valve, a fast feed stop on said segment, a dribble feed stop on said segment spaced from said fast feed, a track member on said segment, a movable member confined for movement on said track, a flexible member connected with said movable member, a counterweight for said flexible member, said counterweight urging said segment from fast to dribble feed, means on said hopper for operating said stop positions, means actuatable by said hopper to re-set said valve, said hopper becoming lower by moving when filling and said segment being operated upon said hopper reaching close fill to operate said valve to close to dribble position, said dribble weight holding said hopper in dribble position until the weight thereof is overcome by the added weight in said hopper at which time said dribble stop is operated by said hopper operating means to release said valve to close and said hopper is released to rotate, said hopper rotating to dump the material therefrom and by the action thereof bringing said valve in open position at which time said valve is re-set and another empty compartment of said hopper is in position to be filled, said machine repeating itself in this cycle of operation as long as the bulk material feeds thereinto, whereby bulk material fed by gravity enters the machine through the valve and is fed rapidly at first to fill a hopper compartment and then slowed down suddenly to a dribble to complete the accurate filling of the compartment and whereby said machine measures and separates units of material for transfer into bags or the like.

6. In a machine for measuring and dividing units of material from a bulk feed source such as a storage hopper feeding by gravity and wherein said machine includes a compartmented hopper rotatably mounted on its own axis and also vertically movable against counterweights and beneath the bulk feed source, a valve on said machine between said bulk feed and said rotatable hopper to feed into the upper hopper compartment, a control segment operatively connected with said valve movable to open and close the valve, a fast feed stop on said segment, a dribble feed stop on said segment spaced from said fast feed, a track member on said segment, a movable member confined for movement on said track, a flexible member connected with said movable member, a counterweight for said flexible member, said counterweight urging said segment from fast to dribble feed, a stop member on said frame engageable with said stops, an actuating member mounted with said hopper and acting on said stop member when said hopper moves downwardly to bring same out of contact, a hopper stop member on said frame, a plurality of hopper fill stop arm members mounted with said hopper in spaced, arcuate position, a plurality of hopper re-set arms mounted with said hopper in spaced, arcuate relation thereon, a re-set member connected with said segment to move same to re-set, said re-set member being operable to move said segment against said counterweight back to open valve position with said stop member in open stop engaging position, said hopper stop member being in engagement with one of said hopper fill stop arms to hold said hopper in fill position with said gate valve open, said hopper becoming dis-engaged from said stop member by moving away therefrom when filling and said segment being operated upon said hopper reaching close fill to operate said valve to close to dribble position, said dribble weight holding said hopper in dribble position until the weight thereof is overcome by the added weight in said hopper at which time said dribble stop becomes dis-engaged from said segment stop member to release said valve to close and said hopper fill arm become dis-engaged from said hopper stop member to release said hopper to rotate, said hopper rotating to dump the material therefrom and by the motion thereof bringing said re-set arm into contact with said re-set member to re-set said valve in open position at which time another empty compartment of said hopper is in position to be filled, said machine repeating itself in this cycle of operation as long as the bulk material feeds there into, whereby bulk material fed by gravity enters the machine through the valve and is fed rapidly at first to fill a hopper compartment and then slowed down suddenly to a dribble to complete the accurate filling of the compartment and whereby said machine measures and separates units of material for transfer into bags or the like.

7. In a machine for measuring and dividing units of material from a bulk feed source such as a storage hopper feeding by gravity and wherein said machine includes a compartmented hopper rotatably mounted on its own axis and also vertically movable beneath the bulk feed source, a stationary frame support for said hopper supporting said hopper for vertical and rotatable movement thereon, a hopper support frame, a weight frame having said hopper support frame attached thereto at one position thereon and being attached to said stationary frame at another position thereon, a weight frame platform attached to said stationary frame, counterweights mounted on said weight frame counterbalancing said hopper to maintain same in substantial upright position, said weights being detachable and selective in amounts, other setting weights supported on said weight frame and being detachable and selective to add to the counterbalancing of said hopper thereby setting the amount to be weighed in close approximation, a dribble weight mounted on said weight platform and being relatively light in weight to represent the difference between the setting weights and the exact weight desired on each measurement, a valve on said machine between said bulk feed and said rotatable hopper to feed into the upper hopper compartment, a control segment movable to open and close said valve, a fast feed stop on said segment, a dribble feed stop on said segment spaced from said fast feed, a track member on said segment, a movable member confined for movement on said track, a flexible member connected with said movable member, a counterweight for said flexible member, said counterweight urging said segment from fast to dribble feed, a stop member on said frame engageable with said stops, an actuating member mounted with said hopper and acting on said stop member when said hopper moves to bring same out of contact, a hopper stop member on said frame, a plurality of hopper fill stop arm members mounted with said hopper in spaced, arcuate position, a plurality of hopper re-set arms mounted with said hopper in spaced, arcuate relation thereon, a re-set member connected with said segment to move same to re-set, said re-set member being operable to move said segment against said counterweight back to open valve position with said stop member in open stop engaging position, said hopper stop member being in engagement with one of said hopper fill stop arms to hold said hopper in fill position with said gate valve open, said hopper becoming dis-engaged from said stop member by moving away therefrom when filling and said segment being operated upon said hopper reaching close fill to operate said valve to close to dribble position, said dribble weight holding said hopper in dribble position until the weight thereof is overcome by the added weight in said hopper at which time said dribble stop becomes dis-engaged from said segment stop member to release said valve to close and said hopper fill arm becomes dis-engaged from said hopper stop member to release said hopper to rotate, said hopper rotating to dump the material therefrom and by the motion thereof bringing said re-set arm into contact with said re-set member to re-set said valve in open position at which time another empty compartment of said hopper is in position to be filled, said machine repeating itself in this cycle of operation as long as the bulk material feeds thereinto, whereby bulk material fed by gravity enters the machine through the valve and is fed rapidly at first to fill a hopper compartment and then slowed down suddenly to a dribble to complete the accurate filling of the compartment and whereby said machine measures and separates units of material for transfer into bags or the like.

8. In a control element for use with a measuring and weighing machine in which a compartmented hopper is both vertically movable and rotatably mounted for movement against a counterweight as it fills from an adjustable valve from a gravity bulk feed, a control segment connected with said adjustable valve, a plurality of stop feed positions on said control segment representing various degrees of feeding material from fast to slow dribble, a track member on said segment, a movable member confined in said track member, a counterweight for said movable member, means connecting said counterweight with said movable member, said movable member and said counterweight tending to close said valve by moving said segment by said counterweight, but being held by said stop feed positions, a retaining member mounted with said hopper for movement therewith as the hopper fills and moves, said member becoming disengaged from said stops as it moves with said hopper thereby moving from one in succession to the other to close said valve.

9. The device in claim 8 including an attaching member mounted with said hopper, a retaining engaging member mounted on said attaching member and protruding adjacent said retaining member, a bearing portion on said retaining member against which said retaining member engaging member bears, a connecting member on said bearing portion extending therefrom, and a resilient member connecting said retaining member engaging member with said retaining member through said resilient member.

10. In a control element for use with a measuring and weighing machine in which a compartmented hopper is both vertically movable and rotatably mounted for movement on a rigid frame against a counterweight frame as it fills from an adjustable valve from a gravity bulk feed, a control segment movably mounted on said rigid frame and being connected with said valve to operate same from open to closed upon movement of said segment, an open stop cam mounted on said segment, a dribble stop cam mounted on said cam in arcuate spaced relation thereto, a track member mounted on said segment, a movable member mounted for movement on said track, a counterweight mounted on said frame, a flexible member connecting said movable member and said counterweight, said weight being up and said movable member being at one end of said track when said valve is open, said weight tending to move downwardly to move said movable member in said track to close said valve, a stop member mounted on said frame movably engaging said stop members one at a time in succession, an attaching plate mounted with said hopper, a bearing plate on said stop member, a pressure member mounted on said plate and pressing on said bearing plate tending to push said stop member from said stop cam, a connecting member on said bearing plate, a resilient member connecting said stop member with said pressure member, whereby as said hopper moves downwardly from filling the pressure member pushes said stop member away from said segment stop permitting said counterweight to close said segment and valve to the dribble stop position prior to said hopper becoming completely filled and rotating.

11. The device in claim 10 wherein said hopper has a plurality of spaced retaining arms fixed therewith corresponding to the number of compartments therein, a stop member on said frame engageable with one of said arms when said hopper is in up position to be filled, a plurality of reset arms mounted for rotation with said hopper in advance of a respective retaining arm for resetting said control segment to open said valve, and a re-set member on said segment engageable by said re-set arm as said hopper returns from dumping to re-fill, whereby said control opens and closes said valve in response to the movement of said hopper from fast filling to dribble filling to dump and back to re-fill again.

12. The device in claim 10 wherein said stop cams are protruding members on said segment and said frame stop member is an arm member engaging said stops.

13. The device in claim 11 wherein said re-set arms and said retaining arms are mounted on a common plate attached to said hopper with all of said re-set arms spaced along the thickness of said plate from said retaining arms, and said hopper stop member is spaced from said re-set member to be engaged only by said retaining arms, whereby the arms are mounted in a small space within said machine.

References Cited in the file of this patent
UNITED STATES PATENTS

| | | |
|---|---|---|
| 1,648,077 | Taylor | Nov. 8, 1924 |
| 2,398,887 | Drinnon | Apr. 23, 1946 |
| 2,613,905 | Muskat | Oct. 14, 1952 |
| 2,618,456 | Parrish | Nov. 18, 1952 |